United States Patent
Cech et al.

(10) Patent No.: US 12,480,607 B2
(45) Date of Patent: Nov. 25, 2025

(54) CONNECTION ELEMENT FOR CONNECTING LINES FOR CONDUCTING A FLUID

(71) Applicant: Hanon Systems, Daejeon (KR)

(72) Inventors: Radim Cech, Novy Jicin (CZ); Jakub Kubricky, Novy Jicin (CZ); Eric Kesler, Novi, MI (US)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 18/718,297

(22) PCT Filed: Dec. 5, 2022

(86) PCT No.: PCT/KR2022/019645
§ 371 (c)(1),
(2) Date: Jun. 10, 2024

(87) PCT Pub. No.: WO2023/106774
PCT Pub. Date: Jun. 15, 2023

(65) Prior Publication Data
US 2025/0043891 A1    Feb. 6, 2025

(30) Foreign Application Priority Data

Dec. 9, 2021 (DE) .................. 10 2021 132 481.5
Nov. 10, 2022 (DE) .................. 10 2022 129 718.7

(51) Int. Cl.
| | | |
|---|---|---|
| *F16L 23/024* | (2006.01) | |
| *F16L 23/028* | (2006.01) | |
| *F16L 47/02* | (2006.01) | |
| *F16L 47/14* | (2006.01) | |
| *F25B 41/40* | (2021.01) | |

(52) U.S. Cl.
CPC .......... *F16L 23/0286* (2013.01); *F16L 47/02* (2013.01); *F16L 47/14* (2013.01); *F25B 41/40* (2021.01)

(58) Field of Classification Search
CPC ......... F16L 39/00; F16L 47/14; F16L 21/007; F16L 19/02; F16L 19/026; F16L 19/00; F16L 23/162; F16L 23/18; F16L 23/16; F16L 23/02; F16L 23/024; F16L 23/0286; F16L 23/032; F25B 41/40
See application file for complete search history.

(56) References Cited

U.S. PATENT DOCUMENTS

| | | | | |
|---|---|---|---|---|
| 6,318,765 B1 * | 11/2001 | Slais | .................. | B60H 1/00571 285/305 |
| 2002/0117850 A1 | 8/2002 | Wood et al. | | |

FOREIGN PATENT DOCUMENTS

| | | |
|---|---|---|
| JP | H08233160 A | 9/1996 |
| KR | 19990053622 A | 7/1999 |
| KR | 20060103714 A | 10/2006 |
| KR | 101448112 B1 | 10/2014 |

* cited by examiner

*Primary Examiner* — Aaron M Dunwoody
(74) *Attorney, Agent, or Firm* — Shumaker, Loop & Kendrick, LLP; James D. Miller

(57) ABSTRACT

A connection element for connecting lines for conducting a fluid, in particular of a fluid circuit of an air-conditioning system of a motor vehicle, is based on the object of specifying a connection element which has high rigidity and low weight and which allows a fluid-tight connection with low production costs. This object is achieved in that the connection element has an attachment means and a connection means, wherein the connection means is arranged in a recess in the attachment means.

16 Claims, 5 Drawing Sheets

A-A

CONNECTION ELEMENT FOR CONNECTING LINES FOR CONDUCTING A FLUID

CROSS REFERENCE TO RELATED PATENT APPLICATIONS

This is a U.S. national phase patent application of PCT/KR2022/019645 filed Dec. 5, 2022 which claims the benefit of and priority to German Patent Application No. 10 2022 129 718.7 filed on Nov. 10, 2022 and German Patent Application No. 10 2021 132 481.5 filed on Dec. 9, 2021, the entire contents of each of which are incorporated herein by reference.

TECHNICAL FIELD

The invention relates to a connection element for connecting lines for conducting a fluid, in particular of a fluid circuit of an air-conditioning system of a motor vehicle. The connection element is arranged between two lines, connecting the lines to one another, or between a line and a component, specifically of the fluid circuit, connecting the line to the component.

In particular, the invention relates to a connection element for lines of a refrigerant circuit which are designed for example as plastic pipes or plastic hoses for conducting the refrigerant. Materials for such plastic pipes or plastic hoses can be, for example, synthetic polymers such as polyethylene (PE), polypropylene (PP), polyamide (PA) or polyvinyl chloride (PVC).

BACKGROUND ART

Motor vehicles are conventionally designed with an air-conditioning system with a refrigerant circuit, in particular to allow targeted air-conditioning of the air of a passenger compartment. Such refrigerant circuits usually have a refrigerant compressor, an evaporator, a condenser or a gas cooler, and an expansion device. The components are connected to one another in a fluid-tight manner via lines in order to close the refrigerant circuit and to ensure the proper performance of the air-conditioning system.

The fluid-tight lines of the refrigerant circuit which connect the components to one another are designed, for example, as pipes or hoses, in particular rubber hoses, or as a connection consisting of pipe and hose. At each line end, that is, pipe end or hose end, there are end pieces or connection elements for a rigid and leak-tight connection of the fluid-tight lines to one another or of the fluid-tight lines to other components of the refrigerant circuit. Such connection elements are also referred to as fittings.

The systems provided for the air-conditioning of motor vehicles, in particular for electrically or at least partially electrically powered motor vehicles, such as electric vehicles or motor vehicles with a hybrid drive, have refrigerant circuits with electrically powered refrigerant compressors. In particular to maximize the range of the motor vehicles, the total weight thereof must be minimized.

Plastic lines have favorable material properties such as a low weight, good de-formability and high corrosion resistance and are used by preference in refrigerant circuits of modern air-conditioning systems, also in conjunction with corresponding connection elements.

Such lines are usually provided with connection elements which are likewise formed from a plastic. The plastic lines and the connection elements can therefore be assembled simply by means of known methods for connecting plastics. Connecting methods known from the prior art for this are, for example, laser welding, friction welding or adhesive bonding of plastics.

A further important criterion is the leak-tightness of the refrigerant circuit in order to prevent escape of the refrigerant. In addition to damaging the environment, the escape of refrigerant from the refrigerant circuit leads to disruptions of the functioning or the functional reliability of the refrigerant circuit and thus of the air-conditioning system of the motor vehicle.

In order to ensure the leak-tightness of the refrigerant circuit, sealing means are used at the connections between two lines or between a line and a further component of the refrigerant circuit. The use of both sealing means acting in the radial direction and sealing means acting in the axial direction is known. Sealing means acting in the axial direction are used by preference owing to high demands for the leak-tightness or for a fluid-tight connection.

In a use, known from the prior art, of sealing means acting in the axial direction, also referred to as seals, forces are generated during the fastening of connection elements to one another or of one connection element to a further component of the refrigerant circuit by means of a screw connection arranged directly next to the actual conduit, which forces can be transmitted to the sealing means arranged in the axial direction in order thus to provide a fluid-tight connection. However, the forces usually do not act only in the desired axial direction and lead to a bending load on the entire connection. The screw connection is arranged parallel to the longitudinal axis of the conduit and spaced from the longitudinal axis of the conduit.

Consequently, the connection element must be designed to be correspondingly me-chanically stable, which is sometimes not possible with the use of certain plastics. In addition, high thermal demands are placed on a described connection element, and therefore conventional connection elements are formed from a material with high rigidity such as a metal. If polymer materials such as polyamide (PA) are used, the material properties are not sufficient to transmit high loads, in particular in the case of axial connections.

Connection elements for connecting lines of an air-conditioning system are known from the prior art.

For instance, DE 10 2021 107 529 A1 discloses a piping system for an air-conditioning system which is intended to be insensitive to vibrations, simple in structure and secure against damage or leaks. The piping system has a refrigerant pipe of an air-conditioning piping of a motor vehicle and a flange element, which are each formed from a plastic material. A piping system is provided in which the refrigerant pipe and the flange element are each formed from a plastic material with a vibration insulation effect and are connected to one another by laser welding. With the piping system, vibration insulation is brought about in addition to weight reduction. The pressure loss of a refrigerant flowing through is minimized because the diameter of the refrigerant pipe is constant in relation to the total length.

The piping system also has a combination of radially and axially acting sealing means with complete polymer fitting. However, the rigidity of a screw-fastening body which is present can change at high temperature, and therefore, in combination with a high internal pressure, the refrigerant can escape from the flange element.

In the case of a seal acting in the radial direction in DE 10 2021 107 529 A1, the re-quirement for the rigidity of the fitting body or connection element is low, since a merely small deformation at elevated temperature and elevated pressure does not yet cause any leakage of the refrigerant. However, the radial seal type known from the prior art does not meet the requirements for current and future systems in which attempts are specifically being made to combine fluid-tight connection elements with sealing means acting in the axial direction.

Consequently, there is a need for an improved connection element for connecting lines of a refrigerant circuit of an air-conditioning system which is designed with a sealing means acting in the axial direction.

SUMMARY

The object of the invention is therefore to specify a connection element for connecting lines for conducting a fluid, in particular for a refrigerant circuit of an air-conditioning system which has a low weight in addition to high rigidity and allows a fluid-tight connection with low production costs.

The object is achieved by subject matter having the features shown and described herein.

The object is achieved by a connection element for connecting lines for conducting a fluid, in particular of a fluid circuit of an air-conditioning system of a motor vehicle. The connection element is arranged between a first line and an attachment opening of a connector of a component of the fluid circuit, in particular of a refrigerant circuit, or between two lines of the fluid circuit.

Fluids or refrigerants which are conducted through the lines and the connection element can be R134a, R1234yf, R152a, R290, R1132a, R32, R744, R600, R600a, R474A, R457C or mixtures of these refrigerants.

According to the concept of the invention, the connection element is designed in at least two parts with an attachment means and a connection means. The connection means is arranged in a recess in the attachment means to form the complete and fully functional connection element.

The attachment means of the connection element has high strength or rigidity and can be formed from a metal, such as aluminum or steel, a composite material, a high-performance plastic, at least one glass fiber material or another reinforced material. Polyether ether ketone (PEEK) is a high-temperature-resistant thermoplastic and belongs to the chemical family of the polyacryletherketones.

The attachment means advantageously has both a recess for receiving the connection means and a through-opening for receiving a fastening means such as a screw. By means of the fastening means fed through the through-opening, the connection element is fixedly connected, in particular screw-fastened, to a second connection element, a bushing or a component of the fluid circuit.

The connection means is preferably formed from a synthetic polymer, in particular polyethylene (PE), polypropylene (PP), polyvinyl chloride (PVC), polyamide (PA) or a polyamide with glass fibers, so that the connection means has a low weight and good corrosion resistance.

According to a preferred embodiment of the invention, the connection means has an attachment flange on a first side. The connection means is connected by the first side to, for example, a line, for example a polymer pipe.

Such a connection between the attachment flange of the connection means and the line can take place by means of laser welding, friction welding or adhesive bonding. For this, the attachment flange of the connection means advantageously has a region designed as a first tubular element. The line to be connected to the connection means of the connection element can be inserted into the first tubular element of the attachment flange and connected to the attachment flange using a method mentioned. Alternatively, the line can be slid onto the first tubular element of the attachment flange and connected to the attachment flange.

According to a development of the invention, the connection means has a connection flange and a second tubular element on a second side opposite the first side. By means of the second tubular element and the connection flange, the connection means of the connection element can be connected to an attachment opening, for example of a component of the fluid circuit. The second tubular element is arranged in the attachment opening, and the connection flange is arranged at the attachment opening.

To form a fluid-tight connection, a sealing means acting in the axial direction or an annular seal is provided preferably on the connection flange of the connection means, in particular between the connection flange and the attachment opening. Such a sealing means acting in the axial direction can be formed from a plastic or a metal or a combination of a plastic and a metal.

Alternatively, the unit formed from the second tubular element and the connection flange of the connection means can also be connected or coupled to a connector of another line using a corresponding adapter or a corresponding bushing. In this embodiment too, a sealing means acting in the axial direction is arranged on the connection flange to form a fluid-tight connection.

According to a further advantageous embodiment of the invention, a first longitudinal axis of the first tubular element and a second longitudinal axis of the second tubular element are arranged parallel to one another, in particular coaxially with one another, in the connection means.

Alternatively, the second side of the connection means is not arranged opposite the first side of the connection means but such that the first longitudinal axis of the first tubular element and the second longitudinal axis of the second tubular element are arranged at an angle within the range of 90° to 180°, in particular at an angle of 90°, to one another.

A particular advantage of the invention consists in that the connection means is fixedly connected to the attachment means by pressing the connection means into the recess in the attachment means. As a result of the fixed pressing, a form-fitting and force-fitting connection is produced between the connection means and attachment means, so that an additional connection, for example adhesive bonding or welding, of the connection means in the attachment means is not necessary.

According to a development of the invention, the recess in the attachment means has two inner first faces which are arranged opposite one another inside the recess. As a counterpart to the two inner first faces of the attachment means, the connection means has two outer second faces, which are arranged likewise opposite one another on the connection means. The two outer second faces of the connection means are part of an asymmetrical design of the connection means in a region which is introduced or pressed into the recess in the attachment means. The term "asymmetrical design of the connection means" relates to a plane deviating from a sectional plane spanned by the second longitudinal axis of the second line and a movement direction when the connection means is introduced into the attachment means.

The connection means is preferably inserted into the recess in the attachment means such that the two inner first faces of the attachment means bear against the two outer second faces of the connection means. The recess in the attachment means in the region of the mutually opposing first faces can be dimensioned relative to the region of the outer second faces of the connection means such that the connection means can be introduced into the recess in the attachment means exclusively by applying a sufficient compressive force to overcome a resistance, so that the connection means is arranged force-fittingly in the recess in the attachment means. This results in a stable and fixed connection of the connection means in the attachment means of the two-part connection element.

For maintenance or repair work, it is possible by applying a corresponding force to remove the connection means from the recess in the attachment means, for example to exchange one of the means.

The connection means can have, in the region in which the connection means is introduced into the recess in the attachment means, a design which is adapted to the recess and is asymmetrical relative to a plane deviating from a sectional plane spanned by the second longitudinal axis of the second line and a movement direction when the connection means is introduced into the attachment means. This can ensure that the connection means is inserted exclusively in a predefined position in the attachment means and incorrect assembly of the attachment means and the connection means to form the connection element is excluded.

According to a further preferred embodiment of the invention, two straight outer contours of the attachment flange of the connection means are oriented at a first angle to one another, while two straight regions of an inner contour of a cut-out region of the attachment means are oriented at a second angle to one another. There can be a difference between the first angle and the second angle. The straight outer contours of the attachment flange do not run parallel to one another but are arranged at the first angle, which is within the range of 0° to 180°, in particular within the range of 0° to 15°, to one another.

According to a development of the invention, the attachment means has, in the region of the recess, a cut-out or milled-out region surrounding the recess, for receiving an attachment flange of the connection means, which attachment flange is asymmetrical relative to a plane deviating from a sectional plane spanned by the second longitudinal axis of the second line and a movement direction when the connection means is introduced into the attachment means. The inner contour of the cut-out region is adapted to the outer contour of the attachment flange of the connection means.

The inner contour of the cut-out region of the attachment means preferably has two straight regions which are oriented at the second angle to one another. The second angle is within the range of 0° to 180°, in particular within the range of 0° to 20°. The difference between the first angle of the attachment flange and the second angle of the inner contour of the cut-out region can be between −5° and +5°, in particular within the range of −2° to +4°, without adversely affecting proper assembly of the attachment means and the connection means to form the connection element.

In order to ensure secure retention after the connection means has been installed in the recess in the attachment means, either a locking element or two mutually opposing locking elements are advantageously formed in the cut-out region of the attachment means. The locking element is arranged, for example, in each case on an end of the recess or of the cut-out region.

The locking element preferably has a height within a range of 0.1 mm to 3.0 mm and a length within a range of 1.0 mm to 5.0 mm. The locking element can be formed with a third angle within a range of 90° to 180° or a radius within a range of 0.1 mm to 3.0 mm.

Advantages of the connection element according to the invention are in particular a low weight, good corrosion resistance, mechanical stability and low leakage of the connection of the connection means of the connection element to a component or a line of a fluid circuit. In addition, the connection means of the connection element can be welded or adhesively bonded in a simple and fluid-tight manner to a line such as a plastic pipe or a plastic hose consisting of a synthetic polymer. The use of a seal arranged on the connection means and acting in the axial direction means that a fluid-tight connection is provided, which is reliably effective even at high pressures and high temperatures.

A state at high pressure and high temperature is understood to mean, for example, a pressure of approximately 85 bar at a temperature of approximately 125° C.

BRIEF DESCRIPTION OF DRAWINGS

Further details, features and advantages of embodiments of the invention can be found in the description of exemplary embodiments below with reference to the associated drawings. In the drawings.

DESCRIPTION OF AN EMBODIMENT

Figure 1:
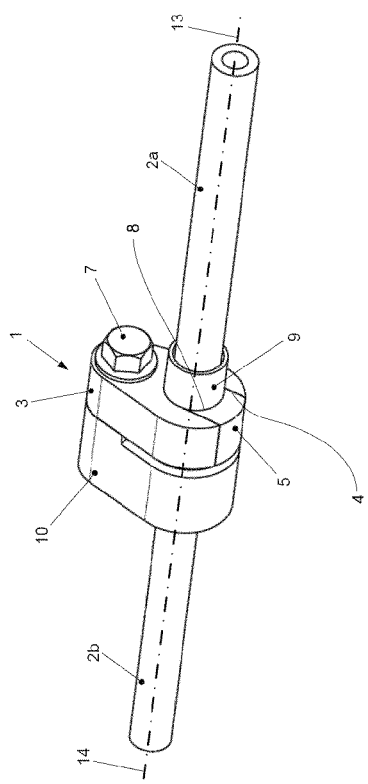
FIG. 1: shows a connection element in an embodiment for connecting two lines, in particular of a refrigerant circuit, in a perspective view.
Figure 2:
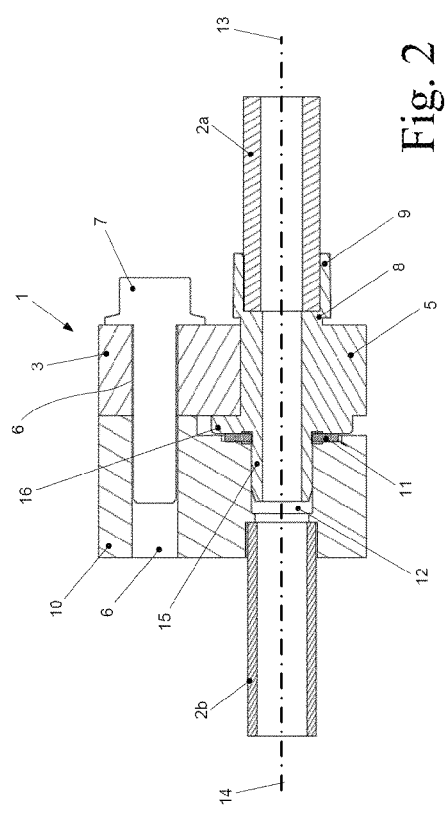
FIG. 2: shows the connection element of FIG. 1 in a sectional representation.

FIG. 1 shows a connection element (1) in a first embodiment for connecting two lines (2a, 2b), in particular of a refrigerant circuit (not shown) of an air-conditioning system, in a perspective view. FIG. 2 shows the connection element (1) of FIG. 1 in a sectional representation.

The connection element (1) has an attachment means (3) with a recess (4) into which the connection means (5) of the two-part connection element (1) is pressed. The attachment means (3) of the connection element (1) has high strength or rigidity and is formed, for example, from a metal, such as aluminum or steel, a composite material, a high-performance plastic, such as high-temperature-resistant polyether ether ketone or PEEK for short, glass fiber materials or another reinforced material.

The attachment means (3) has a through-opening (6) (not visible in FIG. 1) in the form of a bore for receiving a fastening means (7) such as a screw. The fastening means (7) is fed through the through-opening (6), and therefore the through-opening (6) is concealed in FIG. 1.

The connection means (5) of the connection element (1) is formed from a corrosion-resistant material of low density, i.e., a lightweight material such as polyethylene (PE), polypropylene (PP), polyvinyl chloride (PVC), polyamide (PA), or a polyamide with glass fibers. The connection means (5) pressed into the recess (4) in the attachment means (3) and thus fixed firmly in the attachment means (3) has, on a first side, an attachment flange (8) with a cylindrical first tubular element (9) for receiving a first line (2a), such as a pipe consisting of a polymer, for example polyethylene (PE), polypropylene (PP), polyvinyl chloride (PVC), polyamide (PA) or a polyamide with glass fibers, or a hose. The first line (2a) is connected in a fixed and fluid-tight manner to the first tubular element (9) of the attachment flange (8) and thus to the connection means (5) of the connection element (1), for example by means of a welding method or an adhesive bonding method.

The connection element (1) is coupled to a bushing (10), which is connected in a fixed and fluid-tight manner to a second line (2b). The bushing (10) can be formed from a material such as aluminum, steel or a polymer. The second line (2b) can likewise be formed as a pipe from a polymer, for example polyethylene (PE), polypropylene (PP), polyamide (PA), polyvinyl chloride (PVC), aluminum or steel, or as a hose. The lines (2a, 2b) are connected at the distal ends, each pointing towards the connection element (1), for example to a component (not shown) of a refrigerant circuit of an air-conditioning system.

The bushing (10) is a counterpart which fits the connection means (5), such as a so-called female connector piece. The bushing (10) and the connection means (5) are complementary to one another.

The connection means (5) and the bushing (10) are fixedly connected to one another by means of the fastening means (7). Between the connection means (5) of the connection element (1) and the bushing (10), there is a sealing means (11) (not visible in FIG. 1) acting in the axial direction, in order to ensure a fluid-tight connection between the connection means (5) of the connection element (1) and the bushing (10).

The combination of the connection means (5) of the connection element (1) and the bushing (10) shown in particular in FIG. 2 is an exemplary embodiment. The connection means (5) of the connection element (1) can alternatively be attached directly to a corresponding connector or an attachment opening (12) of a component or of a fluid circuit, in particular of a refrigerant circuit of an air-conditioning system, in order thus to produce a fluid-tight connection to the component.

In the embodiment according to FIGS. 1 and 2, the connection element (1) is designed such that a first longitudinal axis (13) of the first tubular element (9) and a second longitudinal axis (14) of a second tubular element (15) of the connection means (5) are oriented coaxially with one another and thus are arranged on a common axis.

As shown in particular in FIG. 2, the bushing (10), like the attachment means (3), also has a through-opening (6) in the form of a bore, which is provided at least partially with an internal thread, in order to receive the fastening means (7), such as a screw, which is fed through the through-opening (6) in the attachment means (3). When the fastening means (7) is screwed into the through-opening (6) in the bushing (10), the attachment means (3) is fixedly connected to the bushing (10).

The connection means (5) has, on the first side oriented towards the first line (2a), the attachment flange (8) with the cylindrical first tubular element (9) for receiving the first line (2a). The first line (2a) is arranged in the first tubular element (9) of the attachment flange (8) and is completely surrounded by the first tubular element (9). The first line (2a) is connected in a fixed and fluid-tight manner to the first tubular element (9) of the attachment flange (8) and consequently to the connection means (5) of the connection element (1), for example by means of a welding method or an adhesive bonding method.

According to FIG. 2, the sealing means (11) acting in the axial direction is arranged between a connection flange (16), formed on a second side of the connection means (5) opposite the first side with the attachment flange (8) and the first tubular element (9) in the axial direction, and the bushing (10), in order to ensure the fluid-tight connection between the connection means (5) of the connection element (1) and the bushing (10).

The arrangement of the sealing means (11) between the connection flange (16) and the bushing (10) and a force caused by the screwing in or tightening of the fastening means (7) mean that a fluid-tight connection of the connection means (5) of the connection element (1) and the bushing (10) is achieved. The sealing means (11) acting in the axial direction can be formed, for example, from one material, such as a plastic or a metal, or from a combination of materials, such as plastic and metal.

The sealing means (11) acting in the axial direction and bearing against a surface of the connection flange (16) is arranged completely surrounding the second tubular element (15) protruding out of the surface of the connection flange (16). The second tubular element (15) extends into the attachment opening (12) in the bushing (10).

In an alternative embodiment, the connection flange (16) with the second tubular element (15) of the connection means (5) is arranged in an attachment opening in a component (not shown in FIG. 2) of, for example, a fluid circuit, in particular of a refrigerant circuit of an air-conditioning system and is connected to the component in a fluid-tight manner using the sealing means (11) acting in the axial direction.

Figure 3:
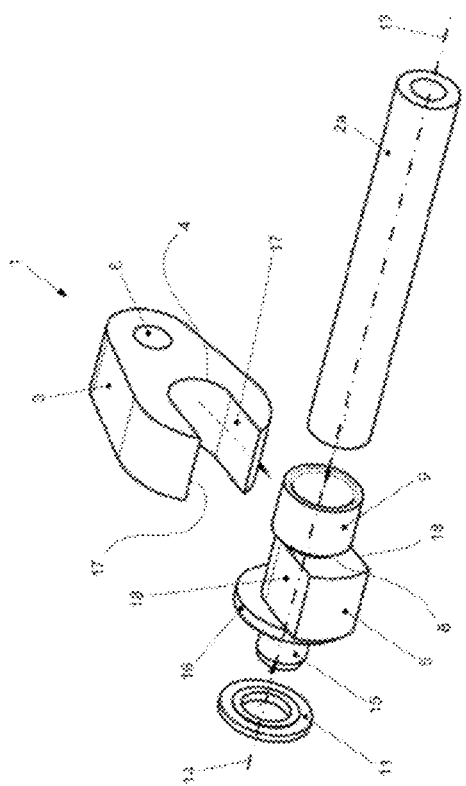
FIG. 3: shows the two-part connection element of FIGS. 1 and 2 in an exploded view.

FIG. 3 shows the two-part connection element (1) from FIGS. 1 and 2 in an exploded view. The attachment means (3) with the through-opening (6) and the connection means (5) of the connection element (1) are shown separately from one another.

The attachment means (3) and the connection means (5) are assembled to form the connection element (1) in an assembly step. The attachment means (3) has the recess (4) with two first mutually opposing faces (17). A first of the two first faces (17) of the recess (4) in the attachment means (3) is visible, while a second of the two first faces (17) of the recess (4) is concealed.

The connection means (5) is formed with two second faces (18), which are arranged, likewise opposite one another, on the outside of the connection means (5). The two first mutually opposing faces (17) of the recess (4) in the attachment means (3) and the two second mutually opposing faces (18) of the connection means (5) have shapes and dimensions which correspond, at least in some regions. The attachment means (3) and the connection means (5) are formed corresponding to one another or complementary to one another in the region of the faces (17, 18). The first faces (17) and the second faces (18) are flat, without any bulges or other elevations.

The connection means (5) is inserted into the recess (4) in the attachment means (3) in an integrated manner such that the inner first faces (17) of the attachment means (3) bear against the outer second faces (18) of the connection means (5). The recess (4) in the attachment means (3) can be configured relative to the outer second faces (18) of the connection means (5) such that the connection means (5) can be pressed into the recess (4) in the attachment means (3) only by the use of a compressive force, so that the connection means (5) is integrated in the recess (4) in the attachment means (3) in a form-fitting and force-fitting manner. This results in a stable and fixed connection of the connection means (5) to the attachment means (3) of the two-part connection element (1).

For maintenance or repair work, it is possible by applying a corresponding force to remove the connection means (5) non-destructively from the recess (4) in the attachment means (3) and thus to separate the connection means (5) from the attachment means (3), in order to exchange the connection means (5) or the attachment means (3), for example.

The first line (2a) is inserted in the direction of the arrow shown into the first tubular element (9) with the attachment flange (8) and thus connected to the connection means (5). To produce the fluid-tight connection, the first line (2a) is, for example, welded or adhesively bonded to the first tubular element (9).

On the other side of the connection means (5), the connection flange (16) and the second tubular element (15) are shown, which are connected, for example, to an attachment opening (12) of a component (not shown) of a refrigerant circuit of an air-conditioning system. The sealing means (11) is arranged between the connection flange (16) and the corresponding component in order to make the connection fluid-tight. The sealing means (11) is pushed over the second tubular element (15) in the direction of the arrow shown.

Figure 4:
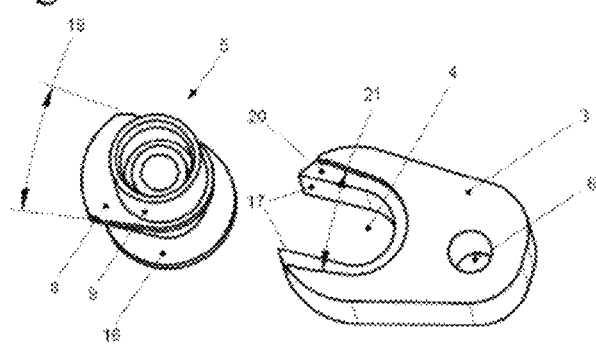
FIG. 4: shows an attachment means and a connection means of the connection element before being assembled to form the connection element, in a perspective view.

FIG. 4 shows the attachment means (3) and the connection means (5) of the connection element (1) before being assembled to form the connection element (1), in a perspective view.

In the region in which the connection means (5) is introduced into the recess (4) in the attachment means (3), the connection means (5) has an asymmetrical design adapted to the recess (4). This ensures that the connection means (5) can be inserted exclusively in a predefined position into the attachment means (3), so that incorrect assembly of the connection means (5) and the attachment means (3) to form the connection element (1) is excluded.

The connection means (5) with the annular connection flange (16) and the attachment flange (8) which is asymmetrical relative to a plane deviating from a sectional plane spanned by the second longitudinal axis (14) of the second line (2b) and a movement direction when the connection means (5) is introduced into the attachment means (3) is thus formed with the first tubular element (9) adjoining the attachment flange (8). The attachment flange (8) has a first angle (19) which is produced between the straight outer contours of the attachment flange (8). The straight outer contours of the attachment flange (8) are oriented at the first angle (19), which is within for example the range of 0° to 180°, in particular within the range of 0° to 15°, to one another. The outer contours of the attachment flange (8) do not run parallel to one another.

On a surface facing the attachment flange (8) of the connection means (5) in the region of the recess (4), the attachment means (3) has a cut-out or milled-out region (20) for receiving the asymmetrical attachment flange (8) of the connection means (5). The inner contour of the cut-out region (20) of the attachment means (3) is adapted to the outer contour of the attachment flange (8) of the connection means (5). The inner contour of the cut-out region (20) of the attachment means (3) and the outer contour of the attachment flange (8) of the connection means (5) correspond to one another.

The inner contour of the cut-out region (20) of the attachment means (3) has two straight regions which are oriented at a second angle (21) to one another. The second angle (21) is for example within the range of 0° to 180°, in particular within the range of 0° to 20°. A difference between the first angle (19) and the second angle (21) can be between −5° and +5° without adversely affecting proper assembly of the connection means (5) and the attachment means (3) to form the connection element (1).

Figure 5A:
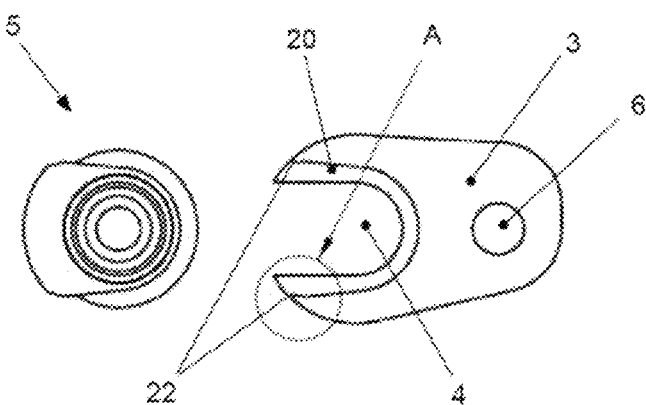
FIG. 5A: shows the attachment means and the connection means of the connection element of FIG. 4 in a view from above.

FIG. 5A shows the attachment means (3) and the connection means (5) of the connection element (1) of FIG. 4 in a view from above. In the cut-out region (20) of the attachment means (3), at least one locking element (22), preferably two mutually opposing locking elements (22), is/are formed in order to ensure secure retention of the connection means (5) in the recess (4) in the attachment means (3) after assembly.

Figure 5B:
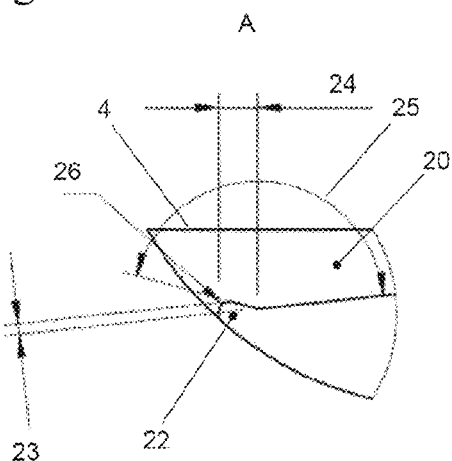
FIG. 5B: shows a first detail representation of a portion "A" of the attachment means of FIG. 5A, FIG. 6: shows a second detail representation of the portion "A" of the attachment means of FIG. 5A, FIG. 7: shows the connection means in an individual part representation, in a perspective view.

FIG. 5B shows a first detail representation of a portion "A" of the attachment means (3) of FIG. 5A. The figure shows the locking element (22), which is formed in the cut-out region (20) of the attachment means (3) and is arranged at one end of the recess (4) or of the cut-out region (20). If two locking elements (22) are formed, these are each provided at one end of the recess (4) or of the cut-out region (20).

The locking element (22) has a height (23) and a length (24). The height (23) is within a range of 0.1 mm to 3.0 mm, while the length (24) is within a range of 1.0 mm to 5.0 mm.

The locking element (22) is formed at a third angle (25) within a range of 90° to 180°. The third angle (25) relates to the limit of the cut-out region (20). The locking element (22) has, at the tip, a radius (26) within the range of 0.1 mm to 3.0 mm.

With such a design of the locking element (22) or of two mutually opposing locking elements (22), it is possible for the connection means (5) pressed into the recess (4) in the attachment means (3) by means of a corresponding force to be retained fixedly, securely and in a correspondingly oriented manner in the attachment means (3). The connection means (5) formed from a polymer is elastically deformed when pressed into the recess (4) in the attachment means (3).

While a force necessary for pressing the connection means (5) into the recess (4) in the attachment means (3) is within the range of 2 N to 200 N, a force for pulling the connection means (5) out of the recess (4) in the attachment means (3) is between 3 N and 1000 N. The ratio of the force necessary for assembling the connection element (1) to a force necessary for disassembly is between 1.5 and 5. The force to be applied for assembling the connection means (5) and the attachment means (3) and for pulling the connection means (5) out of the attachment means (3) is defined by the geometry and the dimensions of height (23), length (24), third angle (25) and radius (26).

Figure 6:
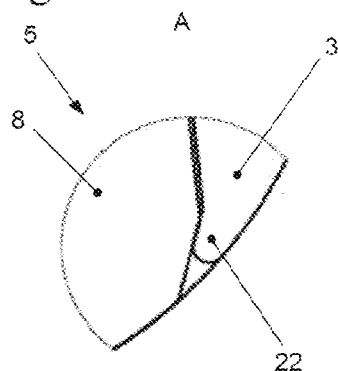

FIG. 6 shows a second detail representation of the portion "A" of the attachment means (3) of FIG. 5A. The connection means (5) is inserted into the recess (4) in the attachment means (3) and locked in the attachment means (3) by the locking element (22). The attachment flange (8) of the connection means (5) bears against the locking element (22) of the attachment means (3).

Figure 7:
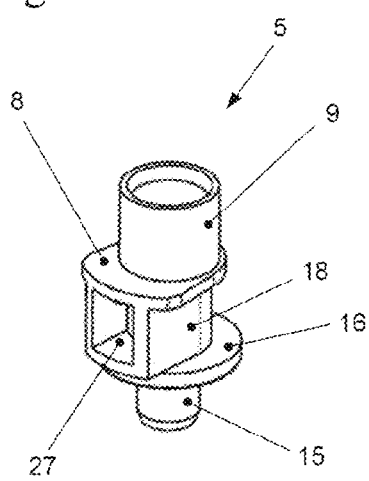

FIG. 7 shows the connection means (5) with the first tubular element (9), the attachment flange (8), the second face (18), the connection flange (16) and the second tubular element (15) in an individual part representation, in a perspective view.

The connection means (5) is produced, for example, by means of an injection-molding method. The connection means (5) has a cavity (27) to save material.

Figure 8A:
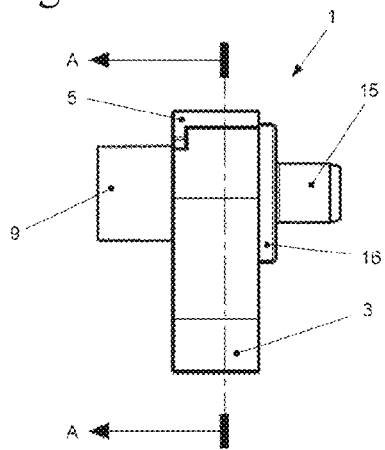
FIG. 8A: shows the connection element in a representation from the side.
Figure 8B:
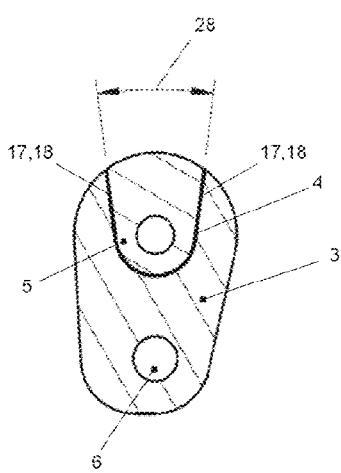
FIG. 8B: shows a sectional representation through the connection element of FIG. 8A, FIG. 9: shows a further embodiment of the connection element in a perspective view.

FIG. 8A shows the connection element (1) with the attachment means (3) and the connection means (5) integrated in the attachment means (3), in a representation from the side. On the connection means (5), the connection flange (16) and the second tubular element (15) are arranged on one side, and the first tubular element (9) is arranged on the other side. FIG. 8B shows a sectional representation through the connection element (1) of FIG. 8A along a sectional plane A-A.

The sectional representation shows a part of the attachment means (3) with the through-opening (6) and the recess (4) with the first faces (17). The connection means (5) with the second faces (18) bears against the first faces (17) of the attachment means (3). If the connection element (1) is arranged in a refrigerant circuit, the refrigerant flows through the opening formed in the connection means (5).

A fourth angle (28) formed between the first faces (17) and the second faces (18) can be within the range of −5° to 20°.

Figure 9:
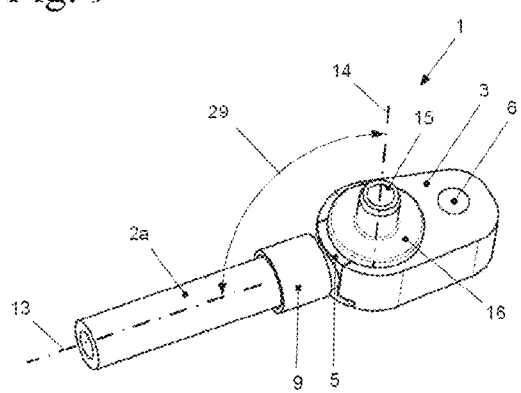

FIG. 9 shows a further embodiment of the connection element (1) in a perspective view. A first line (2a) is arranged in the first tubular element (9) of the connection means (5). The connection means (5) is integrated in the recess (4) in the attachment means (3). The connection flange (16) can be arranged with the second tubular element (15), for example, in an attachment opening (12) in a component (not shown) of, for example, a fluid circuit, in particular of a refrigerant circuit of an air-conditioning system.

In the embodiment of the connection element (1) according to FIG. 9, the second side of the connection means (5) is not opposite the first side of the connection means (5) but is arranged such that the first longitudinal axis (13) of the first tubular element (9) and the second longitudinal axis (14) of the second tubular element (15) form a fifth angle (29) of, for example, 90° to one another.

Figure 10:
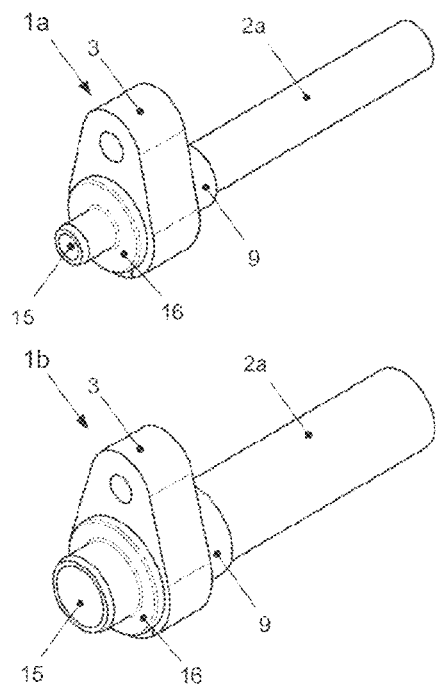
FIG. 10: shows a comparison of two further embodiments of the connection element, each in a perspective view.

FIG. 10 shows a comparison of two further embodiments (1a, 1b) of the connection element (1) with each of the respective embodiments (1a, 1b) of the connection element (1) having different diameters of the first tubular element (9) and of the first line (2a) and different diameters of the connection flange (16) and of the second tubular element (15), in each case in a perspective view. Since the connection element (1) can be used variably, for example within a refrigerant circuit (not shown), both the diameter of the first tubular element (9) and the diameter of the second tubular element (15) are adapted to the demands to be met and thus to the diameters of the lines (2a, 2b) or the attachment openings 12 of the components (not shown) of, for example, a fluid circuit. The connection element (1) can be arranged both on the pressure side and on the suction side in the refrigerant circuit.

The second tubular element (15) forms a so-called male connector to an attachment opening (12) of a component (not shown) of the refrigerant circuit, while the first tubular element (9) forms a so-called female connector to a connector of the refrigerant circuit.

The invention claimed is:

1. A connection element for connecting lines for conducting a fluid, the connection element arranged between a first line and an attachment opening of a connector of a component of a fluid circuit, or between the first line and a second line of the fluid circuit, wherein the connection element has an attachment means and a connection means, wherein the connection means is arranged in a recess in the attachment means, wherein the connection means has, on a first side, an attachment flange and a first tubular element.

2. The connection element according to claim 1, wherein the attachment means is formed from aluminum, steel, a composite material, a high-performance plastic or a glass fiber material.

3. The connection element according to claim 1, wherein the connection means is formed from a polymer, a polyethylene (PE), a polypropylene (PP), a polyvinyl chloride (PVC), a polyamide (PA), or a polyamide with glass fibers.

4. The connection element according to claim 1, wherein the first tubular element receives the first line.

5. The connection element according to claim 1, wherein the connection means has, on a second side opposite the first side, a connection flange and a second tubular element.

6. The connection element according to claim 5, wherein a first longitudinal axis of the first tubular element and a second longitudinal axis of the second tubular element are arranged parallel to one another or coaxially with one another, or at an angle within a range of 90° to 180° to one another in the connection means.

7. The connection element according to claim 5, wherein the connection flange and the second tubular element are arranged at an attachment opening of a component of a refrigerant circuit.

8. The connection element according to claim 7, wherein an annular sealing means is arranged between the connection flange and the attachment opening.

9. The connection element according to claim 1, wherein two first faces are formed in the recess in the attachment means, and two second faces are formed on the connection means, wherein, when the connection means is installed in the recess in the attachment means, the first faces are arranged bearing against the second faces.

10. A connection element for connecting lines for conducting a fluid, the connection element arranged between a first line and an attachment opening of a connector of a component of a fluid circuit, or between the first line and a second line of the fluid circuit, wherein the connection element has an attachment means and a connection means, wherein the connection means is arranged in a recess in the attachment means, wherein the attachment means has, in a region of the recess, a cut-out region surrounding the recess, and wherein the cut-out region is provided on an outer surface of the attachment means.

11. The connection element according to claim 10, wherein the cut-out region has at least one locking element.

12. The connection element according to claim 11, wherein the at least one locking element is designed with a height within a range of 0.1 mm to 3.0 mm.

13. The connection element according to claim 11, wherein the at least one locking element has a length within a range of 1.0 mm to 5.0 mm.

14. The connection element according to claims 11, wherein the at least one locking element has a radius within a range of 0.1 mm to 3.0 mm.

15. The connection element according to claim 10, wherein two straight outer contours of an attachment flange of the connection means are oriented at a first angle to one another, and that two straight regions of an inner contour of the cut-out region of the attachment means are oriented at a second angle to one another, wherein a difference between the first angle and the second angle is within a range of −5° to +5°.

16. The connection element according to claims 15, wherein the at least one locking element has a third angle within a range of 90° to 180°.

\* \* \* \* \*